(12) United States Patent
Reznik et al.

(10) Patent No.: US 7,778,232 B2
(45) Date of Patent: *Aug. 17, 2010

(54) MULTIUSER DETECTOR FOR VARIABLE SPREADING FACTORS

(75) Inventors: Alexander Reznik, Princeton, NJ (US); Timothy J. Lubecki, Westfield, NJ (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 612 days.

This patent is subject to a terminal disclaimer.

(21) Appl. No.: 11/588,454

(22) Filed: Oct. 27, 2006

(65) Prior Publication Data

US 2008/0198828 A1    Aug. 21, 2008

Related U.S. Application Data

(63) Continuation of application No. 10/100,997, filed on Mar. 19, 2002, now Pat. No. 7,136,369, which is a continuation of application No. PCT/US00/02621, filed on Feb. 2, 2000.

(60) Provisional application No. 60/154,985, filed on Sep. 21, 1999.

(51) Int. Cl.
*H04B 7/216* (2006.01)
*H04J 1/16* (2006.01)

(52) U.S. Cl. .................. 370/342; 370/441; 375/140

(58) Field of Classification Search ............ 370/342, 370/441, 209; 375/140
See application file for complete search history.

(56) References Cited

U.S. PATENT DOCUMENTS

| 5,151,919 | A | 9/1992 | Dent |
| 5,204,874 | A | 4/1993 | Falconer |
| 5,799,010 | A | 8/1998 | Lomp et al. |
| 5,970,060 | A | 10/1999 | Baier et al. |
| 6,137,824 | A | 10/2000 | Liu |
| 6,307,867 | B1 | 10/2001 | Roobol et al. |

(Continued)

FOREIGN PATENT DOCUMENTS

EP    1 225 707    7/2002

(Continued)

OTHER PUBLICATIONS

M. Vollmer et al., "Comparative Study of Joint-Detection Techniques for TD-CDMA Based Mobile Radio Systems," IEEE Journal On Selected Areas In Communications, vol. 19, No. 8, Aug. 2001, pp. 1461-1475.

(Continued)

*Primary Examiner*—John Pezzlo
(74) *Attorney, Agent, or Firm*—Volpe and Koenig, P.C.

(57) ABSTRACT

A multiuser detector method and receiver that detects and decodes synchronous or asynchronous CDMA subchannels having different spreading factors with reduced computational complexity. The multiuser receiver is compatible with ZF-BLE, MMSE, decorrelating detectors and the like using Cholesky decomposition to minimize numeric operations. The receiver and method arranges the columns of system transmission response matrices representing the response characteristics of individual users into a total system transmission response matrix which represents a plurality of matched-filter responses for a given block of received data. The invention when used in conjunction with Cholesky decomposition reduces the number of required mathematic operations prior to parallel matched filtering.

20 Claims, 11 Drawing Sheets

U.S. PATENT DOCUMENTS

| | | | |
|---|---|---|---|
| 6,339,612 | B1 | 1/2002 | Stewart et al. |
| 6,347,234 | B1 * | 2/2002 | Scherzer .................. 455/562.1 |
| 6,463,097 | B1 | 10/2002 | Held et al. |
| 6,714,527 | B2 | 3/2004 | Kim et al. |
| 6,724,743 | B1 | 4/2004 | Pigeonnat |
| 6,775,260 | B1 | 8/2004 | Dabak et al. |
| 2001/0053178 | A1 | 12/2001 | Yano et al. |
| 2002/0057730 | A1 | 5/2002 | Karlsson et al. |
| 2003/0043893 | A1 | 3/2003 | Jard et al. |
| 2005/0094712 | A1 * | 5/2005 | Misra et al. .................. 375/147 |
| 2008/0043875 | A1 * | 2/2008 | Misra et al. .................. 375/267 |

FOREIGN PATENT DOCUMENTS

| | | |
|---|---|---|
| GB | 2 366 973 | 3/2002 |
| JP | 2001-016134 | 1/2001 |
| WO | 99/040698 | 8/1999 |
| WO | 00/30270 | 5/2000 |
| WO | 01/22610 | 3/2001 |
| WO | 01/50659 | 7/2001 |
| WO | 2007/131384 | 11/2007 |

OTHER PUBLICATIONS

A. Klein et al., "Zero Forcing and Minimum Mean-Square-Error Equalization for Multiuser Detection in Code-Division Multiple-Access Channels," IEEE Transactions on Vehicular Technology, US, IEEE Inc. New York, vol. 45, No. 2, May 1, 1996 pp. 276-287.

H. R. Karimi et al., "A Novel and Efficient Solution to Block-Based Joint-Detection Using Approximate Cholesky Factorization," IEEE International Symposium on Personal, Indoor and Mobile Radio Communications, vol. 3, 1998, pp. 1340-1345.

J. Mayer et al., "Realtime Feasibility of Joint Detection CDMA," EPMCC, European Personal Mobile Communications Conference Together with Kommunikation, vol. 145, No. 145, 1997, pp. 245-225.

Benvenuto, et al., "Joint Detection with Low Computational Complexity for Hybrid TD-CDMA Systems," IEEE Journal on Selected Areas in Communication, vol. 19, No. 1, pp. 245-253, Jan. 2001.

Horlin, et al., "Channel Adapted CDMA for MAI/ISI-free Power Optimized Burst Transmission with Space Diversity at the Base Station," Global Telecommunications Conference, 2001, GLOBECOM '01, IEEE, pp. 1251-1255, Nov. 29, 2001.

Karimi, et al., "A Novel and Efficient Solution to Block-Based Joint-Detection Using Approximate Cholesky Factorization," IEEE International Symposium on Personal, Indoor and Mobile Radio Communications, vol. 3, pp. 1340-1345, 1998.

Klein, et al., "Zero Forcing and Minimum Mean-Square-Error Equalization for Multiuser Detection in Code-Division Multiple-Access Channels," IEEE Transactions on Vehicular Technology, US, IEEE Inc. New York, vol. 45, No. 2, pp. 276-287, May 1, 1996.

Mayer, et al., "Realtime Feasibility of Joint Detection CDMA," EPMCC, European Personal Mobile Communications Conference Together with Kommunikation, vol. 145, No. 145, pp. 245-225, 1997.

Vollmer, et al., "Comparative Study of Joint-Detection Techniques for TD-CDMA Based Mobile Radio Systems," IEEE Journal On Selected Areas In Communications, vol. 19, No. 8, pp. 1461-1475, Aug. 2001.

Mayer, et al., "Realtime Feasibility of Joint Detection CDMA," EPMCC, European Personal Mobile Communications Conference Together with Kommunikation, vol. 145, No. 145, pp. 245-25, 1997.

* cited by examiner

COMMON SPREADING FACTOR GROUP TRANSMISSION RESPONSE MATRIX $A_G^{(g)}$ ASSEMBLY

MULTIUSER DETECTOR FOR VARIABLE SPREADING FACTORS

This application is a continuation of U.S. patent application Ser. No. 10/100,997, filed Mar. 19, 2002, which is a continuation of international application No. PCT/US00/02621, filed Feb. 2, 2000, which claims priority to U.S. Provisional Patent Application No. 60/154,985, filed Sep. 21, 1999, all of which are incorporated by reference.

BACKGROUND

1. Field of the Invention

The present invention relates generally to multiple access digital communication systems. More specifically, the invention relates to a multiuser detector system and method for the simultaneous reception of data from multiple users having different spreading factors.

2. Description of the Related Art

A multiple-access communication system allows a plurality of users to access the same communication medium to transmit or receive information. The media may comprise, for example, a network cable in a local area network or lan, a copper wire in the classic telephone system, or an air interface for wireless communication.

A prior art multiple access communication system is shown in FIG. 1. The communication media is referred to as a communication channel. Communication techniques such as frequency division multiple access or FDMA, time division multiple access or TDMA, carrier sense multiple access or CSMA, code division multiple access or CDMA and others allow access to the same communication medium for more than one user. These techniques can be mixed together creating hybrid varieties of multiple access schemes. For example, time division duplex or TDD mode of the proposed third generation W-CDMA standard is a combination of TDMA and CDMA.

An example CDMA prior art communication system is shown in FIG. 2. CDMA is a communication technique in which data is transmitted with a broadened band (spread spectrum) by modulating the data to be transmitted with a pseudo-noise signal. The data signal to be transmitted may have a bandwidth of only a few thousand Hertz distributed over a frequency band that may be several million Hertz. The communication channel is being used simultaneously by K independent subchannels. For each subchannel, all other subchannels appear as interference.

As shown, a single subchannel of a given bandwidth is mixed with a unique spreading code which repeats a predetermined pattern generated by a wide bandwidth, pseudo-noise (pn) sequence generator. These unique user spreading codes are typically pseudo-orthogonal to one another such that the cross-correlation between the spreading codes is close to zero. A data signal is modulated with the pn sequence producing a digital spread spectrum signal. A carrier signal is then modulated with the digital spread spectrum signal and transmitted in dependence upon the transmission medium. A receiver demodulates the transmission extracting the digital spread spectrum signal. The transmitted data is reproduced after correlation with the matching pn sequence. When the spreading codes are orthogonal to one another, the received signal can be correlated with a particular user signal related to the particular spreading code such that only the desired user signal related to the particular spreading code is enhanced while the other signals for all other users are not enhanced.

Each value of the spreading code is known as a chip and has a chip rate that is the same or faster than the data rate. The ratio between the chip rate and the subchannel data rate is the spreading factor.

To extend the possible range of values of the data signal, a symbol is used to represent more than two binary values. Ternary and quaternary symbols take on three and four values respectively. The concept of a symbol allows for a greater degree of information since the bit content of each symbol dictates a unique pulse shape. Depending upon the number of symbols used, an equal number of unique pulse or wave shapes exist. The information at the source is converted into symbols which are modulated and transmitted through the subchannel for demodulation at the destination.

The spreading codes in a CDMA system are chosen to minimize interference between a desired subchannel and all other subchannels. Therefore, the standard approach to demodulating the desired subchannel has been to treat all other subchannels as interference, similar to interference that manifests itself in the communication medium. Receivers designed for this process are single-user, matched filter and RAKE receivers.

Since different subchannels do interfere with each other somewhat, another approach is to demodulate all subchannels at a receiver. The receiver can listen to all of the users transmitting at once by running a decoding algorithm for each of them in parallel. This ideology is known as multiuser detection. Multiuser detection can provide a significant performance improvement over single-user receivers.

Referring to FIG. 3, a system block diagram of a prior art CDMA receiver using a multiuser detector is shown. As one skilled in this art realizes, the receiver may include such functions as radio frequency or rf down conversion and associated filtering for radio frequency channels, analog-to-digital conversion or optical signal demodulation for a specific communication media. The output of the receiver is a processed signal, either analog or digital, containing the combined spread signals of all active subchannels. The multiuser detector performs multiuser detection and outputs a plurality of signals corresponding to each active subchannel. All or a smaller number of the total number of subchannels may be processed.

Optimal multiuser detectors are computationally intensive devices performing numerous complex mathematic operations and are therefore difficult to implement economically. To minimize expense, suboptimal multiuser detectors such as linear detectors have been developed requiring less computational complexity as a compromise approximating the performance of optimal detectors. Linear detectors include decorrelators, minimum mean square error or MMSE detectors, and zero-forcing block linear equalizers or ZF-BLEs.

A system block diagram of a prior art linear multiuser detector for synchronous or asynchronous CDMA communication is shown in FIG. 4. Data output from the communication media specific receiver (as in FIG. 3) is coupled to a subchannel estimator which estimates the impulse response of each symbol transmitted in a respective subchannel. The linear detector uses the impulse response estimates along with a subchannel's spreading code to demodulate each subchannel's data. The data is output to subchannel data processing blocks for respective users.

To effect parallel detection of K subchannel users in a physical system, linear multiuser detector methods are executed as fixed gate arrays, microprocessors, digital signal processors or DSPs and the like. Fixed logic systems allow for greater system speed while microprocessor driven systems offer programming flexibility. Either implementation that is responsible for the multiuser detection performs a sequence of mathematic operations. To describe the functions, the following variables typically define the structure and operation of a linear multiuser detector:

K=the total number of users/transmitters that are active in the system.

$N_c$=the number of chips in a data block. The number of chips is required since with varying spreading factors this number is a measure common to all users. The number of chips is divisible by the largest spreading factor allowed. For the case of synchronous CDMA, a symbol from the user with the largest spreading factor may constitute a block of data. Therefore, $N_c$ can be reduced to be equal to the largest spreading factor.

W=the communication channel impulse response length in chips. This is generally a predefined parameter of the system.

$Q^{(k)}$=the spreading factor of user k. The spreading factor is equal to the number of chips that are used to spread a symbol of user's data. A system knows the spreading factors in advance and does not need to estimate them from the received data.

$N_s^{(k)}$=the number of symbols sent by user k. $N_s^{(k)}=N_c/Q^{(k)}$.

$$N_sT = \sum_{k=1}^{K} N_s^{(k)} = \text{the total number of symbols sent.}$$

$d^{(k)}$=the data (information) sent by user k. The data is presented in the form of a vector, where a vector is an array of data indexed by a single index variable. For the purposes of vector and matrix operations which follow, all vectors are defined as column vectors. The $n^{th}$ element of $d^{(k)}$ is the $n^{th}$ symbol transmitted by the $k^{th}$ user.

$h^{(k)}$=the impulse response of the subchannel experienced by user k presented as a vector. This quantity needs to be estimated at the receiver. The receiver's estimates of the subchannel impulse responses are referred to as $h^{(k)}$. The elements of the vector $h^{(k)}$ are typically complex numbers, which model both amplitude and phase variations that can be introduced by the subchannel.

$v^{(k)}$=the spreading code of user k, presented as a vector. For the purposes of linear multiuser detection, it is useful to think of vectors containing the section of the spreading code which spreads a particular symbol. Therefore, the vector $v^{(k,n)}$ is defined as the spreading code which is used to spread the $n^{th}$ symbol sent by the $k^{th}$ user. Mathematically, it is defined as: $v_i^{(k,n)}=v_i^{(k)}$ for $(n-1)Q^{(k)}+1 \leq I \leq nQ^{(k)}$ and 0 for all other I, where I is the index of vector elements.

$r^{(k)}$=a vector which represents user k's data, spread by the spreading sequence $v^{(k)}$ and transmitted through that user's subchannel $h^{(k)}$. The vector $r^{(k)}$ represents channel observations performed during the period of time when a block of data arrives. The $i^{th}$ element of the vector $r^{(k)}$ can be defined as:

$$r_i^{(k)} = \sum_{n=1}^{N_s^{(k)}} d_n^{(k)} \sum_{j=1}^{W} h_j^{(k)} v_{i-j+1}^{(k,n)}.$$

Equation 1

The signal received at the receiver includes all user signals $r^{(k)}$ plus noise. Therefore, we can define the received data vector r as follows:

$$r = \sum_{k=1}^{K} r^{(k)} + n.$$

Equation 2

The vector n in Equation 2 represents noise introduced by the communication channel.

FIG. 5 shows a system and method of a prior art linear multiuser detector. The estimated subchannel impulse response vectors $h^{(k)}$ and the spreading codes $v^{(k)}$ are used to create a system transmission response matrix for each user k. A matrix is a block of numbers indexed by two indexing variables and is arranged as a rectangular grid, with the first indexing variable being a row index and the second indexing variable being a column index.

A system transmission response matrix for user k is typically denoted as $A^{(k)}$. The $i^{th}$-row, $n^{th}$-column element is denoted as $A_{i,n}^{(k)}$ and is defined as:

$$A_{i,n}^{(k)} = \sum_{j=1}^{W} h_j^{(k)} v_{i-j+1}^{(k,n)}$$

Equation 3

Each column of the matrix $A^{(k)}$ corresponds to a matched filter response for a particular symbol sent by user k during the period of interest. Referring back to FIG. 5, the received data r is matched to a combination of all user's spreading codes and subchannel impulse responses. Therefore, $A^{(k)}$ contains $N_s^{(k)}$ matched filter responses. The columns of $A^{(k)}$ are of the form $$A_n^{(k)} = \begin{bmatrix} 0 \\ \vdots \\ 0 \\ b_n^{(k)} \\ 0 \\ \vdots \\ 0 \end{bmatrix}$$

Equation 4 where each vector $b_n^{(k)}$ has a dimension of $Q^{(k)}+W-1$,      Equation 5 and is offset from the top of the matrix $A_n^{(k)}$ by $Q^{(k)}(n-1)$.      Equation 6

Since the spreading codes are not periodic over symbol times; $b_i^{(k)} \neq b_j^{(k)}$ for $I \neq j$. The elements of a vector which may be non-zero values are referred to as the support of the vector. Therefore, $b_n^{(k)}$ is the support of $A_n^{(k)}$.

Once a system transmission matrix for each user is created, a total system transmission response matrix, denoted as A is created by concatenating the system transmission matrices for all the users as shown below:

$A=[A^{(1)}, \ldots, A^{(k)}, \ldots, A^{(K)}]$.      Equation 7

In accordance with prior art modulation techniques, the elements of $h^{(k)}$ can be complex numbers. It then follows that the non-zero elements of A can be complex numbers.

An example total system transmission response matrix A for a hypothetical prior art multiuser detector assembled in accordance with Equations 4, 5, 6 and 7 is $$A = \begin{bmatrix} b^{(1)}_{1,1} & 0 & 0 & 0 & 0 & 0 & 0 & 0 & b^{(2)}_{1,1} & 0 & 0 & 0 \\ b^{(1)}_{1,2} & 0 & 0 & 0 & 0 & 0 & 0 & 0 & b^{(2)}_{1,2} & 0 & 0 & 0 \\ b^{(1)}_{1,3} & b^{(1)}_{2,1} & 0 & 0 & 0 & 0 & 0 & 0 & b^{(2)}_{1,3} & 0 & 0 & 0 \\ b^{(1)}_{1,4} & b^{(1)}_{2,2} & 0 & 0 & 0 & 0 & 0 & 0 & b^{(2)}_{1,4} & 0 & 0 & 0 \\ b^{(1)}_{1,5} & b^{(1)}_{2,3} & b^{(1)}_{3,1} & 0 & 0 & 0 & 0 & 0 & b^{(2)}_{1,5} & b^{(2)}_{2,1} & 0 & 0 \\ 0 & b^{(1)}_{2,4} & b^{(1)}_{3,2} & 0 & 0 & 0 & 0 & 0 & b^{(2)}_{1,6} & b^{(2)}_{2,2} & 0 & 0 \\ 0 & b^{(1)}_{2,5} & b^{(1)}_{3,3} & b^{(1)}_{4,1} & 0 & 0 & 0 & 0 & b^{(2)}_{1,7} & b^{(2)}_{2,3} & 0 & 0 \\ 0 & 0 & b^{(1)}_{3,4} & b^{(1)}_{4,2} & 0 & 0 & 0 & 0 & 0 & b^{(2)}_{2,4} & 0 & 0 \\ 0 & 0 & b^{(1)}_{3,5} & b^{(1)}_{4,3} & b^{(1)}_{5,1} & 0 & 0 & 0 & 0 & b^{(2)}_{2,5} & b^{(2)}_{3,1} & 0 \\ 0 & 0 & 0 & b^{(1)}_{4,4} & b^{(1)}_{5,2} & 0 & 0 & 0 & 0 & b^{(2)}_{2,6} & b^{(2)}_{3,2} & 0 \\ 0 & 0 & 0 & b^{(1)}_{4,5} & b^{(1)}_{5,3} & b^{(1)}_{6,1} & 0 & 0 & 0 & b^{(2)}_{2,7} & b^{(2)}_{3,3} & 0 \\ 0 & 0 & 0 & 0 & b^{(1)}_{5,4} & b^{(1)}_{6,2} & 0 & 0 & 0 & 0 & b^{(2)}_{3,4} & 0 \\ 0 & 0 & 0 & 0 & b^{(1)}_{5,5} & b^{(1)}_{6,3} & b^{(1)}_{7,1} & 0 & 0 & 0 & b^{(2)}_{3,5} & b^{(2)}_{4,1} \\ 0 & 0 & 0 & 0 & 0 & b^{(1)}_{6,4} & b^{(1)}_{7,2} & 0 & 0 & 0 & b^{(2)}_{3,6} & b^{(2)}_{4,2} \\ 0 & 0 & 0 & 0 & 0 & b^{(1)}_{6,5} & b^{(1)}_{7,3} & b^{(1)}_{8,1} & 0 & 0 & b^{(2)}_{3,7} & b^{(2)}_{4,3} \\ 0 & 0 & 0 & 0 & 0 & 0 & b^{(1)}_{7,4} & b^{(1)}_{8,2} & 0 & 0 & 0 & b^{(2)}_{4,4} \\ 0 & 0 & 0 & 0 & 0 & 0 & b^{(1)}_{7,5} & b^{(1)}_{8,3} & 0 & 0 & 0 & b^{(2)}_{4,5} \\ 0 & 0 & 0 & 0 & 0 & 0 & 0 & b^{(1)}_{8,4} & 0 & 0 & 0 & b^{(2)}_{4,6} \\ 0 & 0 & 0 & 0 & 0 & 0 & 0 & b^{(1)}_{8,5} & 0 & 0 & 0 & b^{(2)}_{4,7} \end{bmatrix}$$

Equation 8 for two (k=2) users, $A^{(1)}$ and $A^{(2)}$, having sixteen chips in a data block ($N_c=16$), a channel impulse response length of four (W=4) and a spreading factor for the first user of two ($Q^{(1)}=2$) and a spreading factor for the second user of four ($Q^{(2)}=4$). In the resultant total system transmission response matrix A, $b_{n,i}^{(k)}$ denotes the $i^{th}$ element of the combined system and channel response for the $n^{th}$ symbol of the $k^{th}$ user.

The received data r is processed using the total system transmission response matrix A which represents a bank of matched filter responses to create a vector of matched-filter outputs which is denoted as y. The matched filtering operation is defined as $$y = A^H r.$$

Equation 9

The matrix $A^H$ represents the Hermitian (or complex) transpose of the matrix A. The Hermitian transpose is defined as $A_{ij}^H = \overline{A}_{ji}$ where the over-bar denotes the operation of taking a conjugate of a complex number. The matched filter outputs are then multiplied by the inverse of an objective matrix O. The objective matrix O represents the processing which differentiates each type of linear receiver model. It is derived from the system transmission matrix A.

The zero-forcing block linear equalizer (ZF-BLE) receiver is a linear receiver with an objective matrix specified as $O = A^H A$. The minimum mean square error block linear equalizer (MMSE-BLE) receiver is a linear receiver with an objective matrix specified as $O = A^H A + \sigma^2 I$ where $\sigma^2$ is the variance of the noise present on each of the symbols of the received data vector r and the matrix I is known as an identity matrix. An identity matrix is square and symmetric with is on its main diagonal and zeros everywhere else. The size of the identity matrix is chosen so as to make the addition operation valid according to the rules of linear algebra.

For a decorrelator (decorrelating receiver), matrix A is simplified by ignoring the channel responses $h^{(k)}$, considering only the spreading codes and their cross-correlation (interference) properties. A cross-correlation matrix, commonly referred to as R, is generally constructed for decorrelator type receivers. This matrix can be constructed by assuming that W=1 and $h_i^{(k)}=1$ in the definition of A above (i.e. the channel response of every subchannel is an impulse). Then the cross correlation matrix R is the objective matrix O as defined for the ZF-BLE receiver. A decorrelator often serves as a subprocess of a more complex multiuser detection receiver. Once the objective matrix is created, the multiuser detector will invert the matrix, denoted as $O^{-1}$.

The inverse of the objective matrix is then multiplied by the matched filter output vector y to produce estimates of the data vector d where $d(\text{estimate}) = O^{-1} y$. The inversion of the objective matrix O is a complex, computationally intensive process. The number of operations required to perform this process increase as the cube of the size of the matrix O. For most asynchronous CDMA receivers, the size of O is very large which makes the process of inversion impracticable.

To overcome this limitation, and to make the system physically realizable, a numerical method due to Cholesky is used. Cholesky decomposition can significantly reduce the computational complexity of inverting the matrix O if the matrix is banded.

A banded matrix is a square matrix that contains non-zero values only on several diagonals away from the main diagonal. The number of non-zero diagonals adjacent to the main diagonal that have at least one non-zero element is referred to as bandwidth. Thus, a symmetric matrix M is said to be banded with bandwidth p if $$m_{ij} = 0 \text{ for all } j > l+p,$$

Equation 10 where $m_{ij}$ is an element of M, with l being the row index and j the column index. For a banded matrix with size denoted as n and bandwidth denoted as p, Cholesky decomposition can reduce the required numeric operations of inverting the objective matrix O from varying as the cube of the size of the matrix, $n^3$, to varying as the size of the matrix times the square of the bandwidth, $np^2$.

As discussed above, the objective matrix for a ZF-BLE receiver is $O=A^H A$. To illustrate the numeric complexity, the objective matrix O for the total system response matrix A shown in Equation 6 is $$O = \begin{bmatrix} x & x & x & 0 & 0 & 0 & 0 & 0 & x & x & 0 & 0 \\ x & x & x & x & 0 & 0 & 0 & 0 & x & x & 0 & 0 \\ x & x & x & x & x & 0 & 0 & 0 & x & x & x & 0 \\ 0 & x & x & x & x & x & 0 & 0 & x & x & x & 0 \\ 0 & 0 & x & x & x & x & x & 0 & 0 & x & x & x \\ 0 & 0 & 0 & x & x & x & x & x & 0 & x & x & x \\ 0 & 0 & 0 & 0 & x & x & x & x & 0 & 0 & x & x \\ 0 & 0 & 0 & 0 & 0 & x & x & x & 0 & 0 & x & x \\ x & x & x & x & 0 & 0 & 0 & 0 & x & x & 0 & 0 \\ x & x & x & x & x & x & 0 & x & x & x & x & 0 \\ 0 & 0 & x & x & x & x & x & x & 0 & x & x & x \\ 0 & 0 & 0 & 0 & x & x & x & x & 0 & 0 & x & x \end{bmatrix} \quad \text{Equation 11}$$

where zeros denote all elements that by mathematical operation yield zero and with x's representing non-zero values. If the non-zero elements of the $i^{th}$ row and $j^{th}$ column of the total system response matrix A do not have the same vector index, then the corresponding element of objective matrix O with row index I and column index j will be 0. The bandwidth of O (Equation 11) is equal to 9 since there are non-zero elements as far as nine columns away from the main diagonal.

The objective matrix O as it is constructed in the prior art receiver shown in FIG. 5 is not well banded. Therefore, Cholesky decomposition cannot be used effectively to reduce the operational complexity when inverting matrix O. However, the prior art discloses that when all users transmit with equal spreading factors, a re-arrangement of the total system transmission response matrix A can be performed prior to calculating an objective matrix O, turning matrix O into a banded matrix. A system block diagram for this process is shown in FIG. 6.

The process which computes the column re-arrangement of matrix A performs the re-arrangement without any additional information. The re-arrangement reduces the operational complexity when inverting the matrix. Once the detection procedure is complete, a user data vector d is computed, a reversed re-arrangement process is performed descrambling vector d back to its original form for further processing.

In a typical asynchronous CDMA system, the bandwidth of a re-arranged objective matrix is at least ten times less than its original size. Therefore, a savings of at least a factor of 100 in processing time is achieved when Cholesky decomposition is performed on an objective matrix based upon a re-arranged total system response matrix. However, the prior art has not addressed a re-arrangement method for when different spreading factors are in use between active users.

Accordingly, there exists a need to determine a method to reduce the number of inversion steps when different spreading factors are in use.

SUMMARY

The present invention relates to a multiuser detector method and receiver that detects and decodes synchronous or asynchronous CDMA subchannels having different spreading factors with reduced computational complexity. The multiuser receiver of the present invention is preferably compatible with ZF-BLE, MMSE, decorrelating detectors and the like using Cholesky decomposition to minimize numeric operations. The receiver and method arranges the columns of system transmission response matrices representing the response characteristics of individual users into a well-banded total system transmission response matrix which represents a plurality of matched-filter responses for a given block of received data. The invention when used in conjunction with Cholesky decomposition reduces the number of required mathematic operations prior to parallel matched filtering.

BRIEF DESCRIPTION OF THE DRAWING(S)

DETAILED DESCRIPTION OF THE PREFERRED EMBODIMENT(S)

Figure 1:
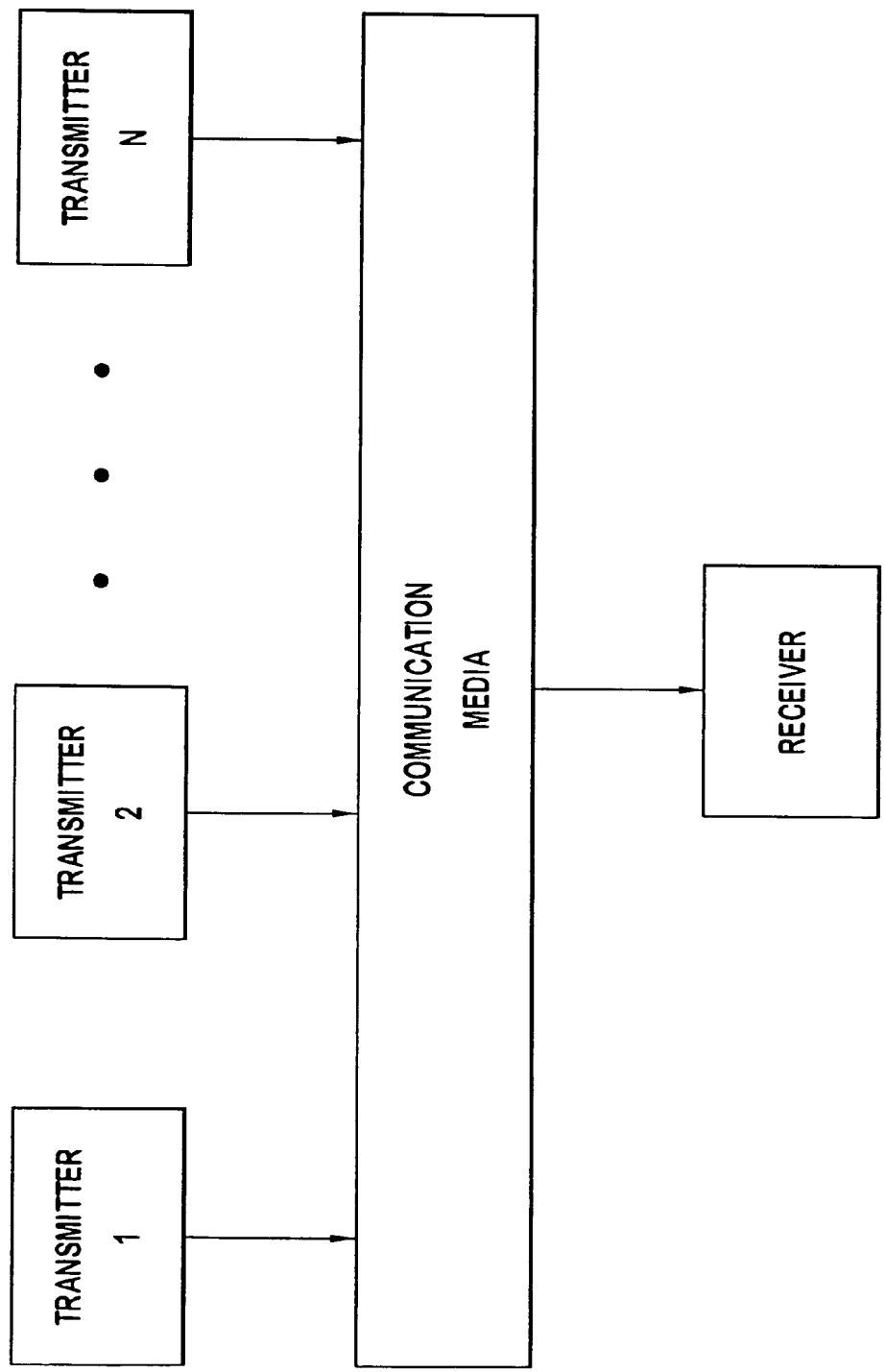
FIG. 1 is a simplified block diagram of a prior art multiple access communication system.
Figure 2:
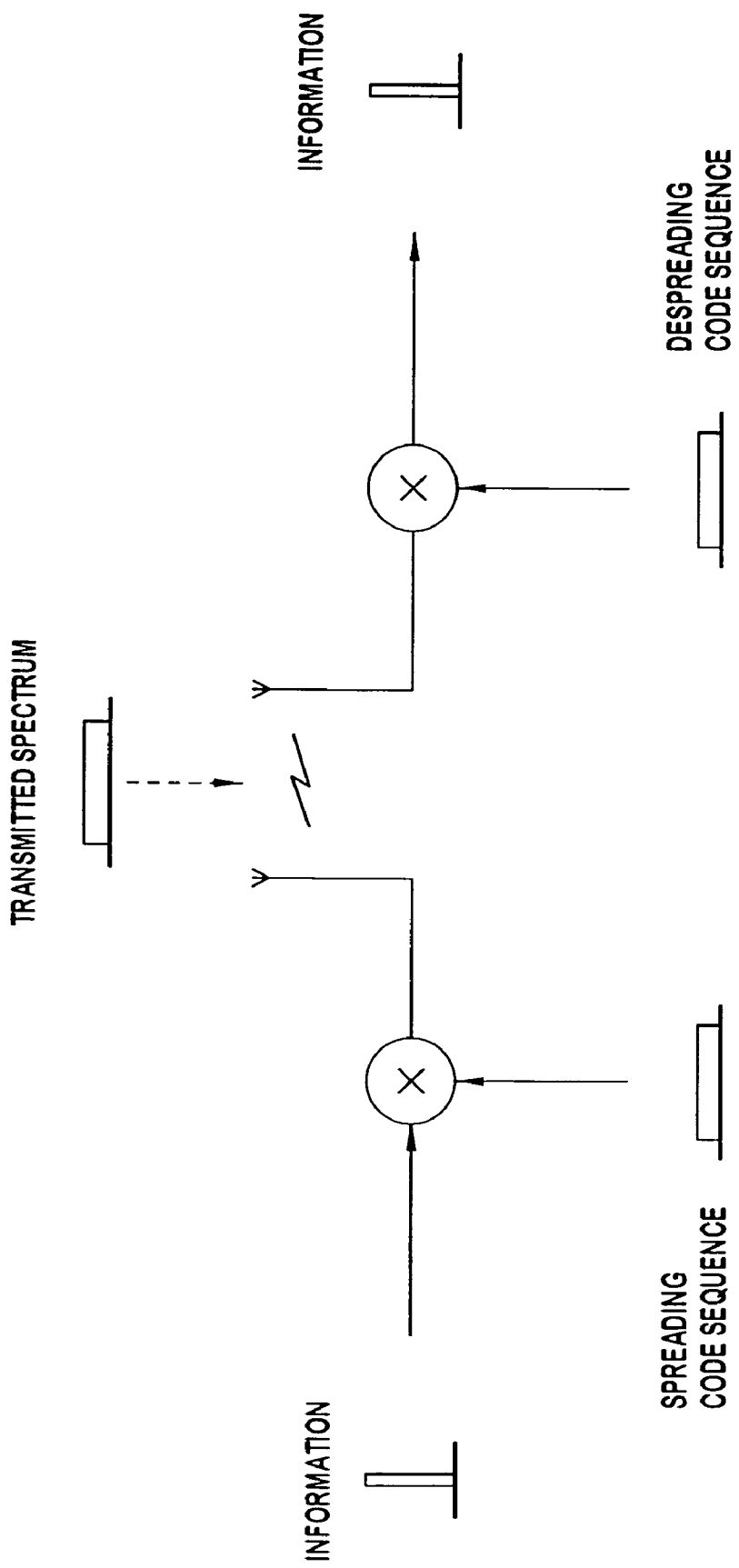
FIG. 2 is a simplified block diagram of a prior art CDMA communication system.
Figure 3:
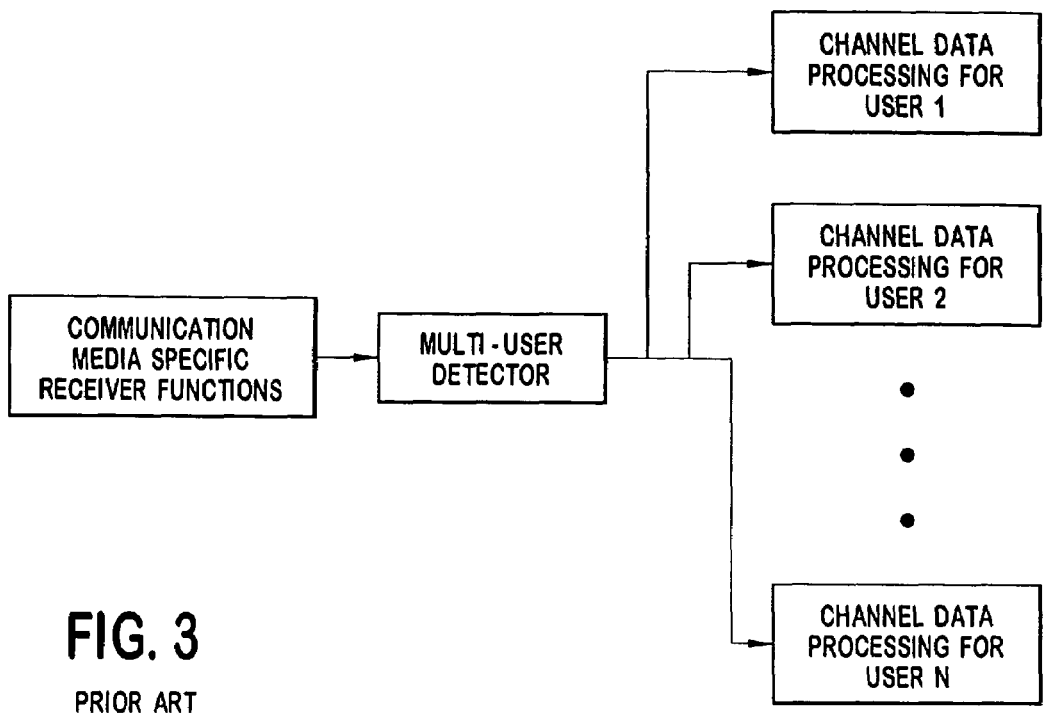
FIG. 3 is a simplified block diagram of a prior art CDMA receiver with multiuser detection.
Figure 4:
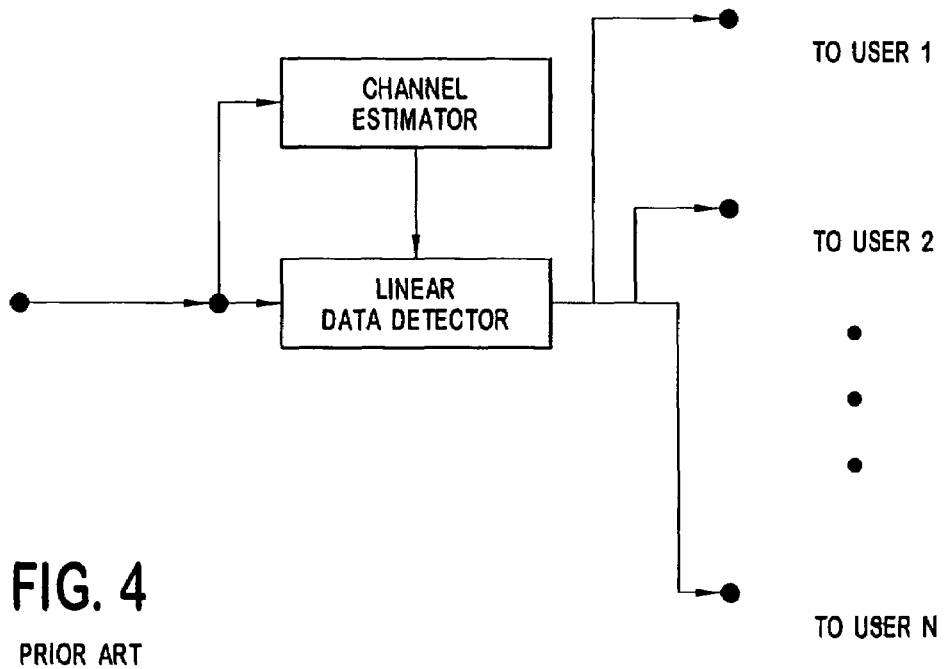
FIG. 4 is a simplified block diagram of a prior art multiuser detector.
Figure 5:
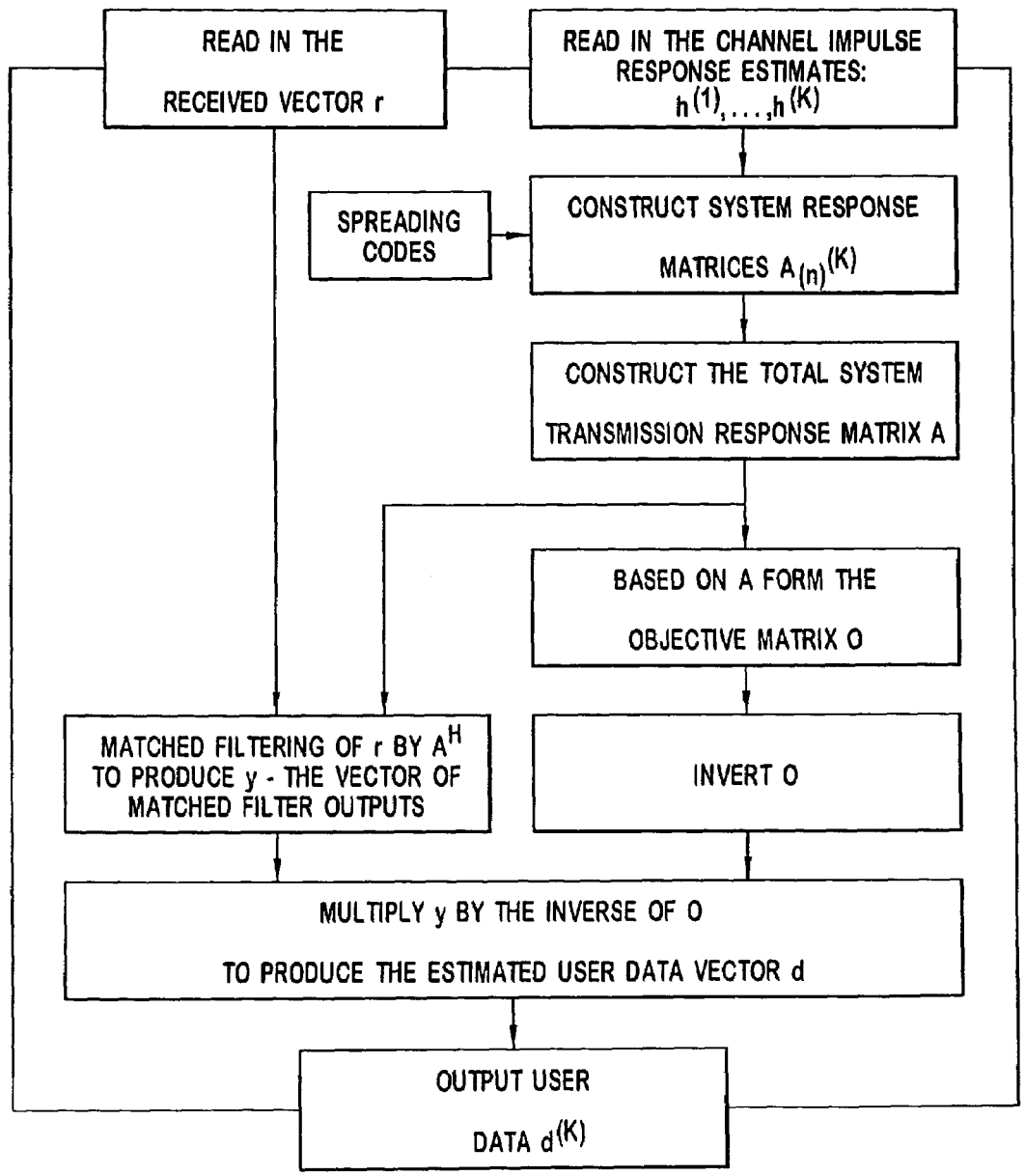
FIG. 5 is a block diagram of a prior art linear multiuser detector.
Figure 6:
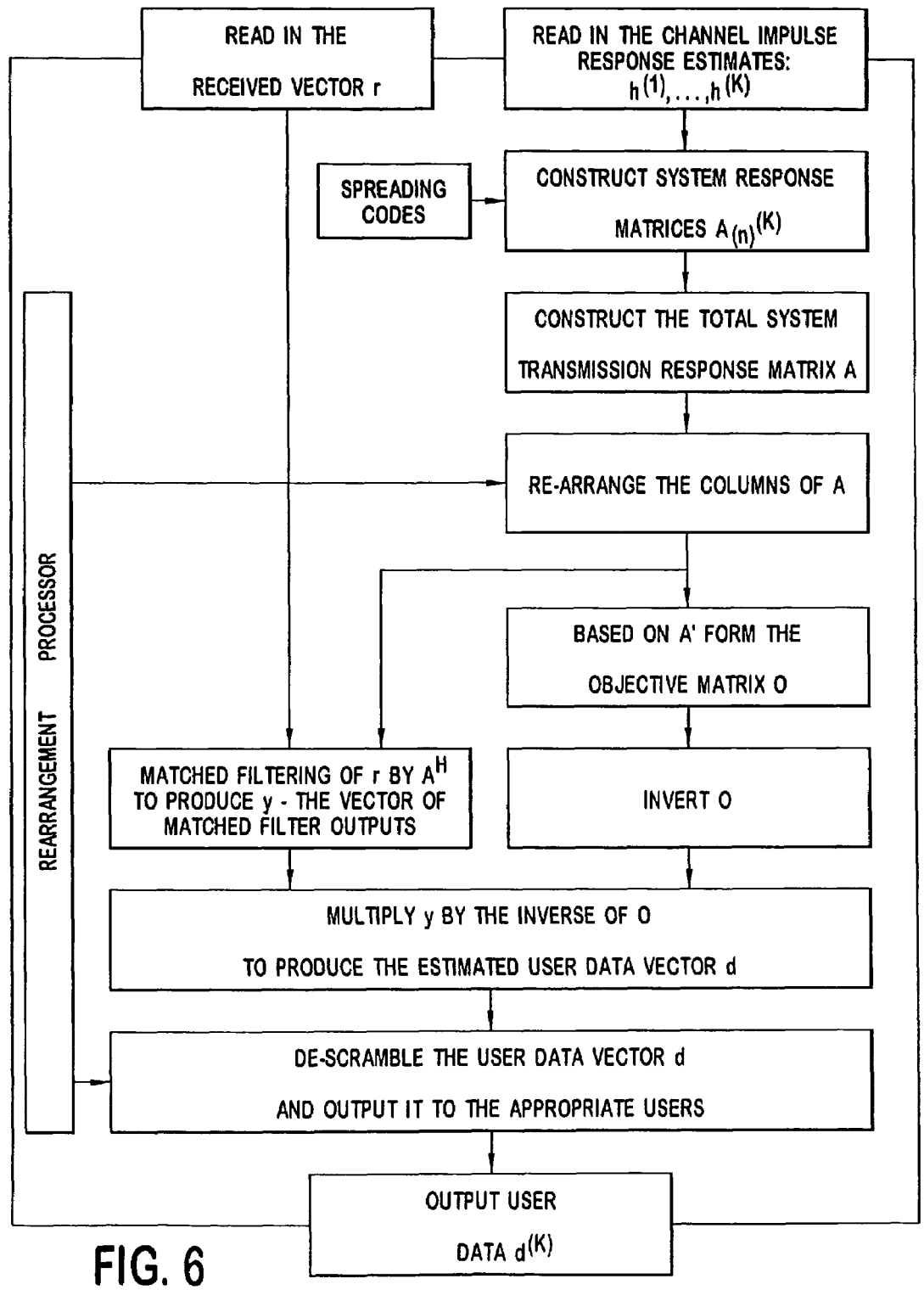
FIG. 6 is a block diagram of a prior art linear multiuser detector using Cholesky decomposition.

The embodiments will be described with reference to the drawing figures where like numerals represent like elements throughout.

Figure 7:
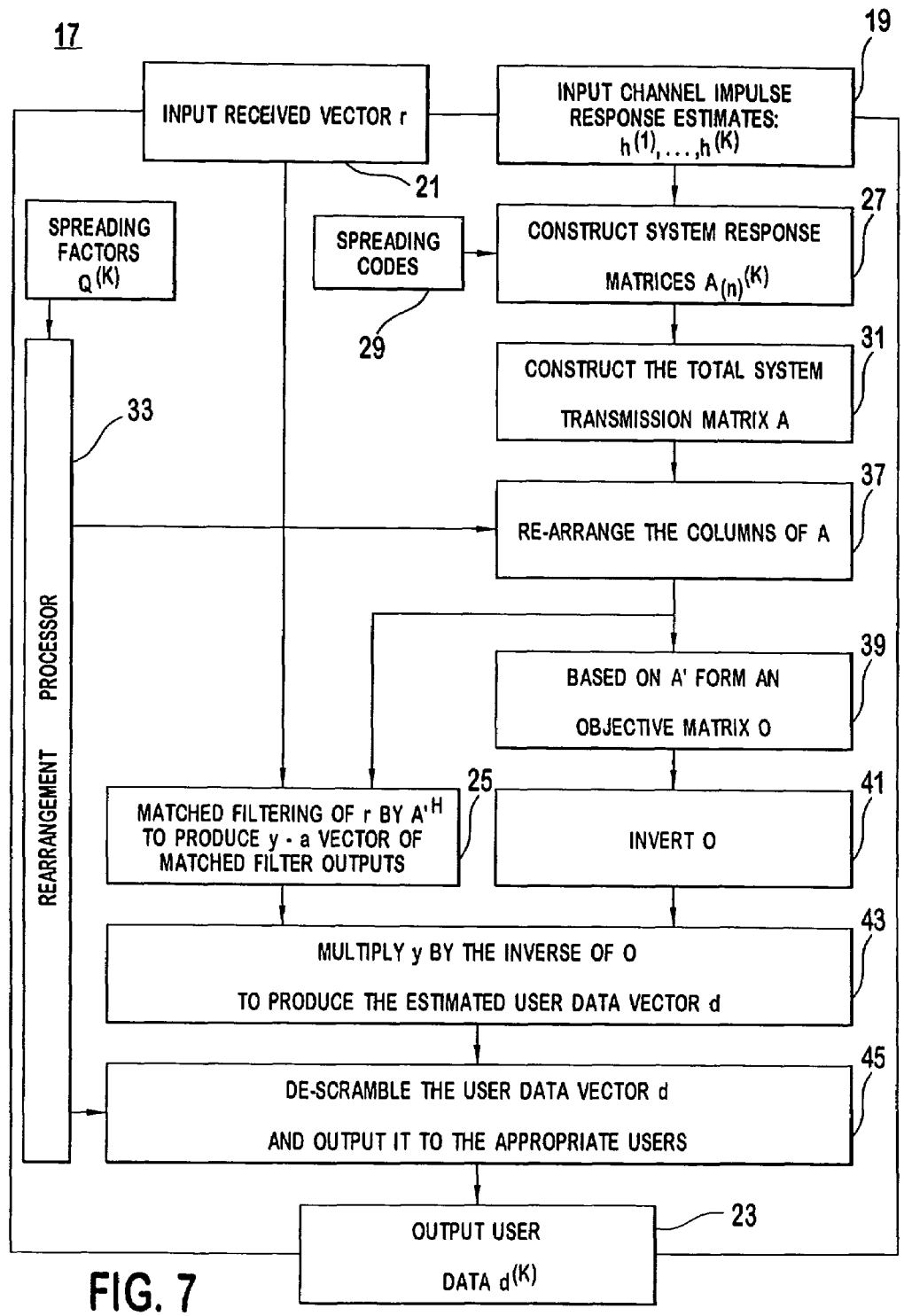
FIG. 7 is block diagram of a linear multiuser detector of the present invention.

Shown in FIG. 7 is a multiuser detector 17 of the present invention for detecting, after reception, a plurality of users transmitting over a common CDMA channel. The multiuser detector 17 comprises a plurality of processors having collateral memory which perform various vector and matrix operations. Alternate embodiments of the invention include fixed gate arrays and DSPs performing the functions of the various processors. The detector 17 also comprises a first input 19 for inputting individual k subchannel impulse response estimates modeled as vectors $h^{(k)}$ to correct intersymbol interference or ISI caused by a subchannel's own symbols and multiple access interference or MAI caused by symbols from other user's subchannels for all received data signals, a second input 21 for inputting data from all users k transmitted in a discreet block of time in the form of an input vector r containing the combined data from each user's subchannel and an output 23 for outputting user data $d^{(k)}$ for each user k from the received channel data r in the form of an output vector. The total number of users K and the spreading factor $Q^{(k)}$ 41 for each user (k=1, 2, 3 ... K) are known a priori.

To obtain user data $d^{(k)}$ for a specific user from the combined user data r, the user data must be filtered using a matched filter 25 or the like. One knowledgeable in this art recognizes that a matched filter 25 requires a response characteristic which is the complex conjugate of the combination of the spread pulse shape and the user's subchannel impulse response to produce an output with a level representative of the signal prior to transmission. Signals input to the filter 25 which do not match with a given response characteristic produce a lower output.

Each individual k subchannel impulse response estimate $h^{(k)}$ is input to a first memory 27 where it is combined with the same user's spreading code 29 (Equation 3) creating a system transmission response estimate matrix $A^{(k)}$ for that user. An arrangement processor 33 of the present invention 17 performs a re-ordering of all matrix $A_n^{(k)}$ columns. The arrangement method 99 requires that each subchannel system transmission response matrix $A^{(k)}$ have the column structure defined by Equation 4 which is typical of linear receivers. If the system transmission response matrices $A^{(k)}$ are not of the form defined by Equation 4, the arrangement processor 33 first re-arranges the columns to the structure defined by Equation 4. The present invention 17 does not require that all system transmission response matrices $A^{(k)}$ be concatenated into a total system transmission response matrix A as defined by Equation 7.

Figure 8:
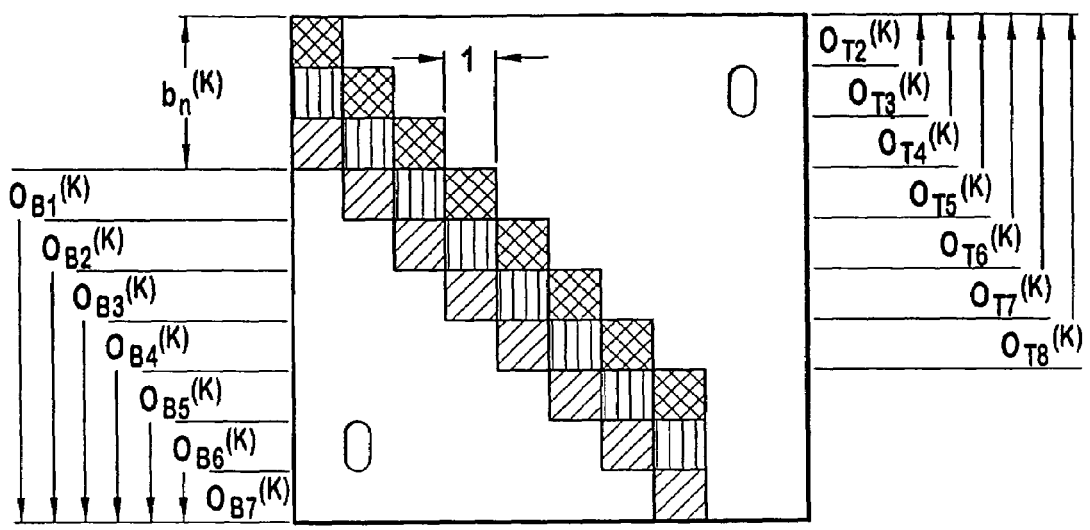
FIG. 8 depicts system transmission response matrix $A^{(k)}$ top and bottom column offsets.
Figure 9:
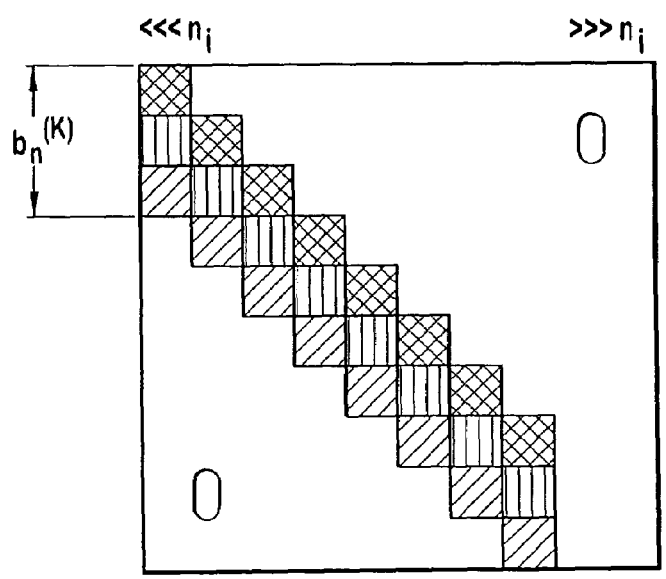
FIG. 9 depicts matrix column index value assignment.

The arrangement processor 33 examines each system transmission response matrix $A^{(1)}, A^{(2)}, A^{(3)}, \ldots A^{(k)}$ column for the number of zero-value elements from the support of each vector $b_n^{(k)}$ (Equation 4) defining top $O_{Tn}^{(k)}$ and bottom $O_{Bn}^{(k)}$ offsets as shown in FIG. 8 (for one matrix). As previously described, each system transmission response matrix $A^{(k)}$ has the same number of rows; only the number of columns vary. As shown in FIG. 9, the arrangement processor 33 assigns an index value $n_i$ for each column of each system transmission response matrices $A^{(k)}$ based upon their respective top $O_{Tn}^{(k)}$ and bottom $O_{Bn}^{(k)}$ offsets. The column values are assigned in the order of increasing magnitude from columns having minimal top offset with maximum bottom offset to columns having maximum top offset with minimal bottom offset.

If two columns are encountered where one has a greater top offset and a greater bottom offset than another, if the difference between top offsets is greater than the difference between bottom offsets, the column with the lower top offset is assigned the lower index $n_i$. If the difference between bottom offsets is greater than the difference between top offsets, the column with the greater bottom offset is assigned the lower index $n_i$. If the differences between top and bottom offsets are equal, either of the two columns can be assigned the lower index $n_i$.

The arrangement processor 33 assembles a total system transmission response matrix A' in the order of the assigned column indices $n_i$. The column indices $n_i$ are retained in memory 33 for use during the descrambling process 45. As an example, using the total system response matrices $A^{(1)}$ and $A^{(2)}$ described and shown in Equation 8, the arrangement method 99 of the present invention 17 produces the total system transmission response matrix A shown below $$A' = \begin{bmatrix} b_{1,1}^{(1)} & b_{1,1}^{(2)} & 0 & 0 & 0 & 0 & 0 & 0 & 0 & 0 & 0 & 0 \\ b_{1,2}^{(1)} & b_{1,2}^{(2)} & 0 & 0 & 0 & 0 & 0 & 0 & 0 & 0 & 0 & 0 \\ b_{1,3}^{(1)} & b_{1,3}^{(2)} & b_{2,1}^{(1)} & 0 & 0 & 0 & 0 & 0 & 0 & 0 & 0 & 0 \\ b_{1,4}^{(1)} & b_{1,4}^{(2)} & b_{2,2}^{(1)} & 0 & 0 & 0 & 0 & 0 & 0 & 0 & 0 & 0 \\ b_{1,5}^{(1)} & b_{1,5}^{(2)} & b_{2,3}^{(1)} & b_{3,1}^{(1)} & b_{2,1}^{(2)} & 0 & 0 & 0 & 0 & 0 & 0 & 0 \\ 0 & b_{1,6}^{(2)} & b_{2,4}^{(1)} & b_{3,2}^{(1)} & b_{2,2}^{(2)} & 0 & 0 & 0 & 0 & 0 & 0 & 0 \\ 0 & b_{1,7}^{(2)} & b_{2,5}^{(1)} & b_{3,3}^{(1)} & b_{2,3}^{(2)} & b_{4,1}^{(1)} & 0 & 0 & 0 & 0 & 0 & 0 \\ 0 & 0 & 0 & b_{3,4}^{(1)} & b_{2,4}^{(2)} & b_{4,2}^{(1)} & 0 & 0 & 0 & 0 & 0 & 0 \\ 0 & 0 & 0 & b_{3,5}^{(1)} & b_{2,5}^{(2)} & b_{4,3}^{(1)} & b_{5,1}^{(1)} & b_{3,1}^{(2)} & 0 & 0 & 0 & 0 \\ 0 & 0 & 0 & 0 & b_{2,6}^{(2)} & b_{4,4}^{(1)} & b_{5,2}^{(1)} & b_{3,2}^{(2)} & 0 & 0 & 0 & 0 \\ 0 & 0 & 0 & 0 & b_{2,7}^{(2)} & b_{4,5}^{(1)} & b_{5,3}^{(1)} & b_{3,3}^{(2)} & b_{6,1}^{(1)} & 0 & 0 & 0 \\ 0 & 0 & 0 & 0 & 0 & 0 & b_{5,4}^{(1)} & b_{3,4}^{(2)} & b_{6,2}^{(1)} & 0 & 0 & 0 \\ 0 & 0 & 0 & 0 & 0 & 0 & b_{5,5}^{(1)} & b_{3,5}^{(2)} & b_{6,3}^{(1)} & b_{7,1}^{(1)} & b_{4,1}^{(2)} & 0 \\ 0 & 0 & 0 & 0 & 0 & 0 & b_{3,6}^{(2)} & b_{6,4}^{(1)} & b_{7,2}^{(1)} & b_{4,2}^{(2)} & 0 \\ 0 & 0 & 0 & 0 & 0 & 0 & b_{3,7}^{(2)} & b_{6,5}^{(1)} & b_{7,3}^{(1)} & b_{4,3}^{(2)} & b_{8,1}^{(1)} \\ 0 & 0 & 0 & 0 & 0 & 0 & 0 & 0 & b_{7,4}^{(1)} & b_{4,4}^{(2)} & b_{8,2}^{(1)} \\ 0 & 0 & 0 & 0 & 0 & 0 & 0 & 0 & b_{7,5}^{(1)} & b_{4,5}^{(2)} & b_{8,3}^{(1)} \\ 0 & 0 & 0 & 0 & 0 & 0 & 0 & 0 & 0 & b_{4,6}^{(2)} & b_{8,4}^{(1)} \\ 0 & 0 & 0 & 0 & 0 & 0 & 0 & 0 & 0 & b_{4,7}^{(2)} & b_{8,5}^{(1)} \end{bmatrix} \quad \text{Equation 12}$$

The arrangement method 99 indexed the eight columns (1-8) of system transmission response matrix $A^{(1)}$ and the four columns (9-12) of system transmission response matrix $A^{(2)}$ in an order of 1, 9, 2, 3, 10, 4, 5, 11, 6, 7, 12, 8 to create a well-banded total system transmission response matrix A (Equation 12).

The arrangement method 99 embodiment described above involves an examination of each system transmission response matrix $A^{(1)}, A^{(2)}, A^{(3)}, \ldots A^{(k)}$ comparing each column with every other column for top $O_{Tn}^{(k)}$ and bottom $O_{Bn}^{(k)}$ offsets. Given the special structure of each system transmission response matrix $A^{(k)}$, namely, that the columns of each matrix are arranged in order of increasing top offsets and decreasing bottom offsets as you progress from left to right (reference Equation 8, matrices $A^{(1)}$ and $A^{(2)}$), an alternative method 199 can be performed without having to examine each system transmission response matrix $A^{(k)}$ directly.

Figure 10A:
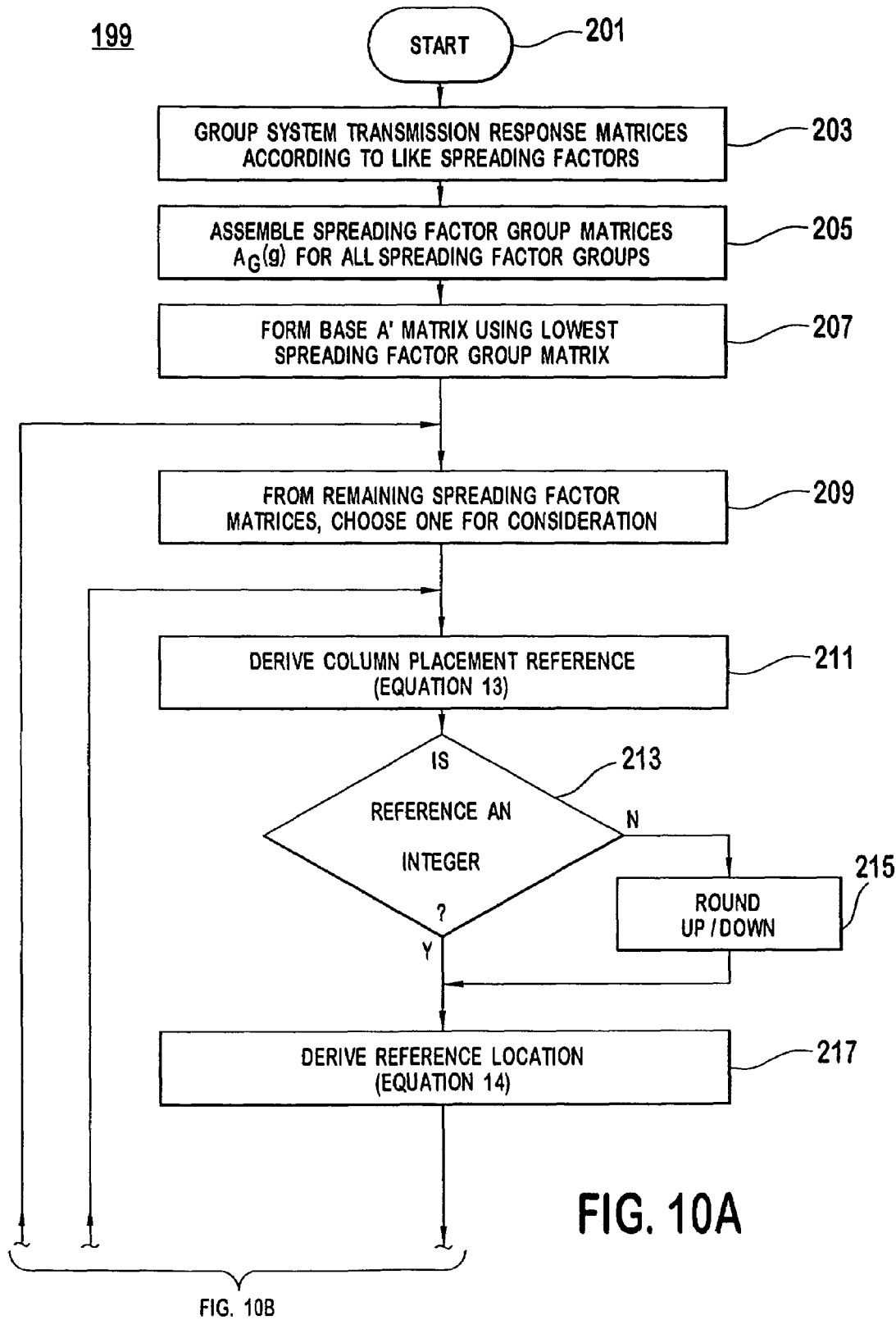
FIGS. 10A and 10B are flow diagrams of an alternative method implementing the present invention.
Figure 10B:
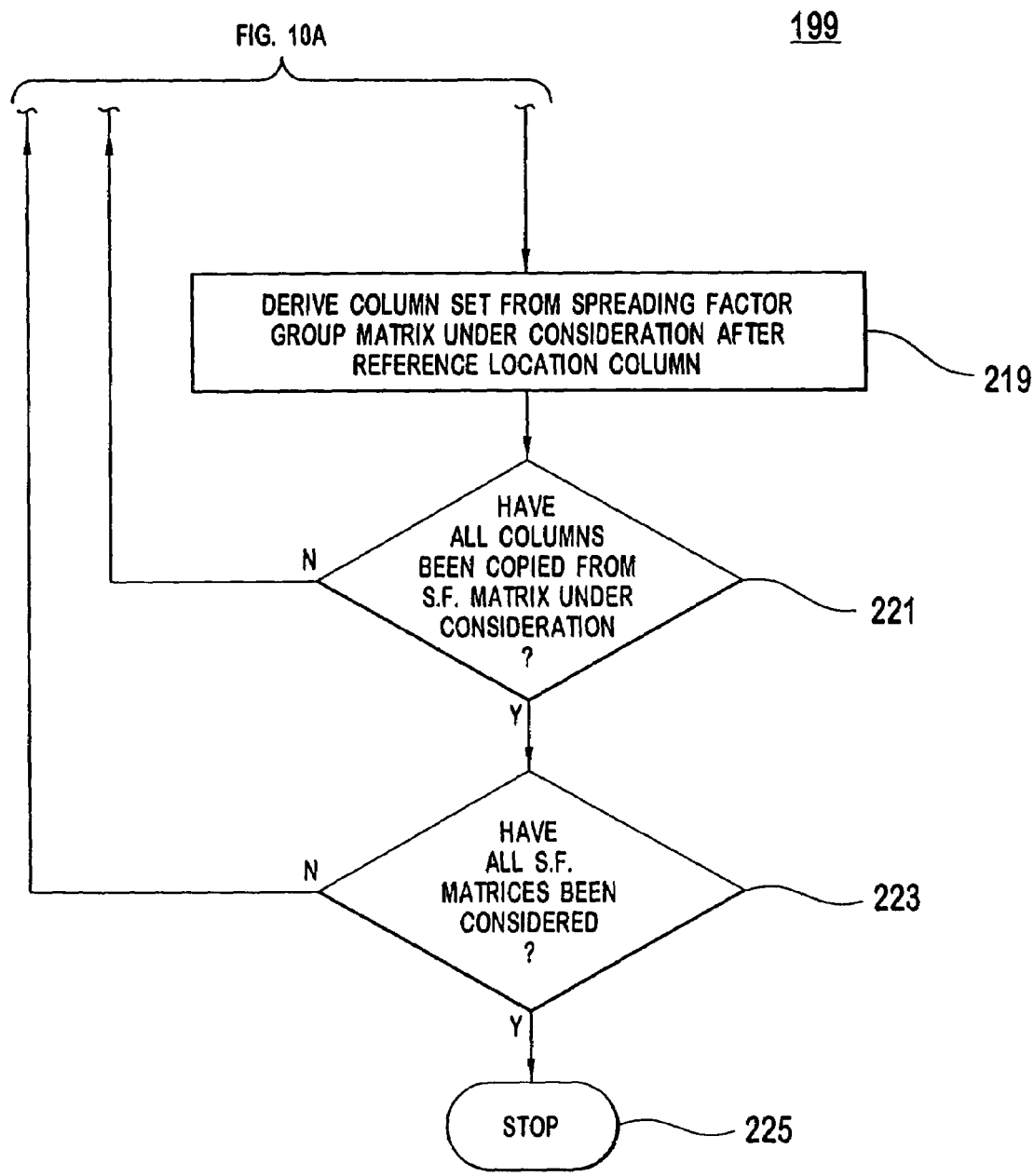

The alternative method 199 is shown in FIGS. 10A and 10B. All system transmission response matrices $A^{(k)}$ corresponding (step 201) to users having equal spreading factors are grouped together (step 203). For each spreading factor group g, memories are allocated within the processor 33 capable of storing all of the columns from all system transmission matrices $A^{(1)}, A^{(2)}, A^{(3)}, \ldots A^{(k)}$. The spreading factor groups g are arranged in order of increasing spreading factor.

An exemplary system illustrating the performance of the present invention 199 contains seven users having four different spreading factors $Q^{(k)}$ assigned as follows:

User 1 ($Q^{(1)}$)=8 User 2 ($Q^{(2)}$)=8 User 3 ($Q^{(3)}$)=8 User 4 ($Q^{(4)}$)=32 User 5 ($Q^{(5)}$)=16 User 6 ($Q^{(6)}$)=16 User 7 ($Q^{(7)}$)=4.

Using the system and method 199 of the present invention 17, the system transmission response matrices $A^{(k)}$ are separated into spreading factor groups:

| | |
|---|---|
| group 1 (spreading factor 4) | $A^{(7)}$ |
| group 2 (spreading factor 8) | $A^{(1)}, A^{(2)}, A^{(3)}$ |
| group 3 (spreading factor 16) | $A^{(5)}, A^{(6)}$ |
| group 4 (spreading factor 32) | $A^{(4)}$. |

A respective spreading factor group g comprises at least one system transmission response matrix $A^{(k)}$, where each matrix $A^{(k)}$ is arbitrarily indexed from 1 to $L^{(g)}$. Each spreading factor group g is indexed according to increasing spreading factor magnitude.

Figure 11:
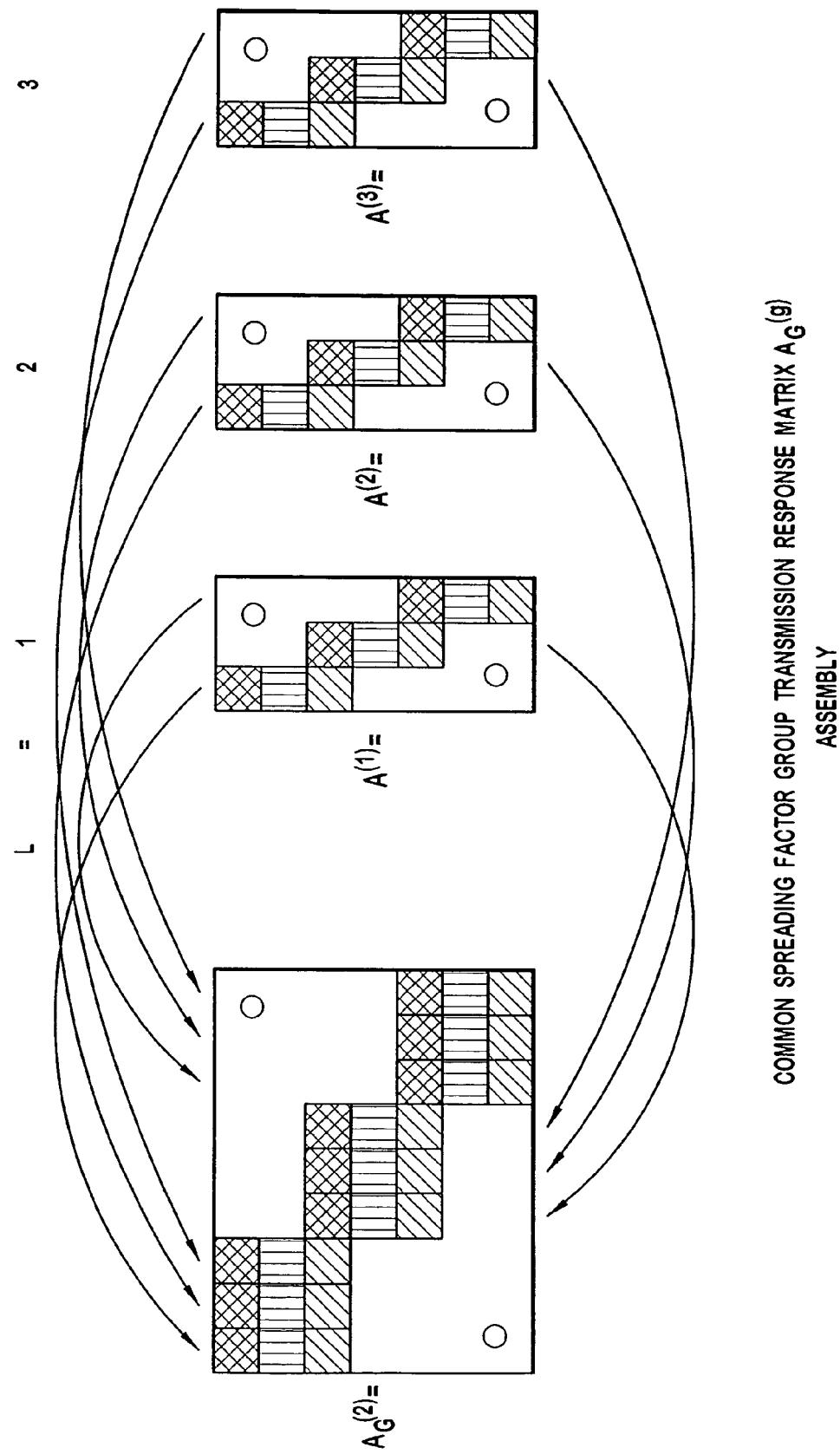
FIG. 11 depicts the steps for assembling a spreading factor group matrix $A_G^{(g)}$.

Within each spreading factor group, the columns of the associated system transmission response matrices $A^{(k)}$ are assembled into common spreading factor group transmission response matrices $A_G^{(g)}$, where g=1, 2, 3, ... G (step 205). As shown in FIG. 11, the method 199 copies the first column of the system transmission response matrix having index one to the first blank column of $A_G^{(g)}$; the first column of the system transmission response matrix having index two to the second blank column of $A_G^{(g)}$; continuing throughout the remaining system transmission response matrices in a respective spreading factor group g until all first columns are copied. The method 199 proceeds with copying the second columns, the third columns, etc., for each matrix $A^{(k)}$ in the respective spreading factor group $A_G^{(g)}$.

All matrices in a spreading factor group g have the same number of columns due to the same spreading factor. Therefore, the assembled spreading factor group transmission response matrices $A_G^{(g)}$ will have $L^{(g)}$ times the number of columns in one associated system transmission response matrices $A^{(k)}$.

To assemble a total system transmission response matrix A' accommodating variable spreading factors, the spreading factor group transmission response matrix $A_G^{(g)}$ having the lowest spreading factor is copied sequentially (step 207) into memory 33a, beginning with the first column, i.e., column one of $A_G^{(g)}$, to the first allocated column of A'. The spreading factor group transmission response matrix $A_G^{(g)}$ having the lowest spreading factor has the maximum number of columns. All other spreading factor group transmission response matrix columns will be inserted into this base matrix A'.

If the system spreading factors are even integer multiples of each other (step 209), the processor 33 assembles the total system transmission matrix A' (step 211) by considering the remaining spreading factor group transmission matrices $A_G^{(g)}$ in any order (step 209). For each spreading factor group transmission matrix $A_G^{(g)}$, the processor 33 derives a column placement reference index m, $$m = n \cdot \frac{Q^{(g)}}{Q^{(1)}} - \frac{Q^{(g)}}{2 \cdot Q^{(1)}} \quad \text{Equation 13}$$

where $Q^{(g)}$ denotes the spreading factor associated with the spreading factor group transmission matrix $A_G^{(g)}$ under consideration, $Q^{(1)}$ denotes the lowest spreading factor among all groups and n is the column of the spreading factor group transmission response matrix $A_G^{(g)}$ under consideration where n=1, 2, 3, ... N (step 211).

To use the column placement index m, a reference location in A' is derived (step 215) using the total number of system transmission response matrices $L^{(1)}$ that constitute the spreading factor group matrix having the lowest spreading factor, $$m \times L^{(1)} \quad \text{Equation 14}$$

The processor 33 derives a column set from the spreading factor group transmission response matrix $A_G^{(g)}$ under consideration (step 217) using the number of system transmission response matrices that belong to the spreading factor group currently under consideration, $$L^{(g)} \times (n-1)+1 \text{ through } L^{(g)} \times n. \quad \text{Equation 15}$$

Figure 12:
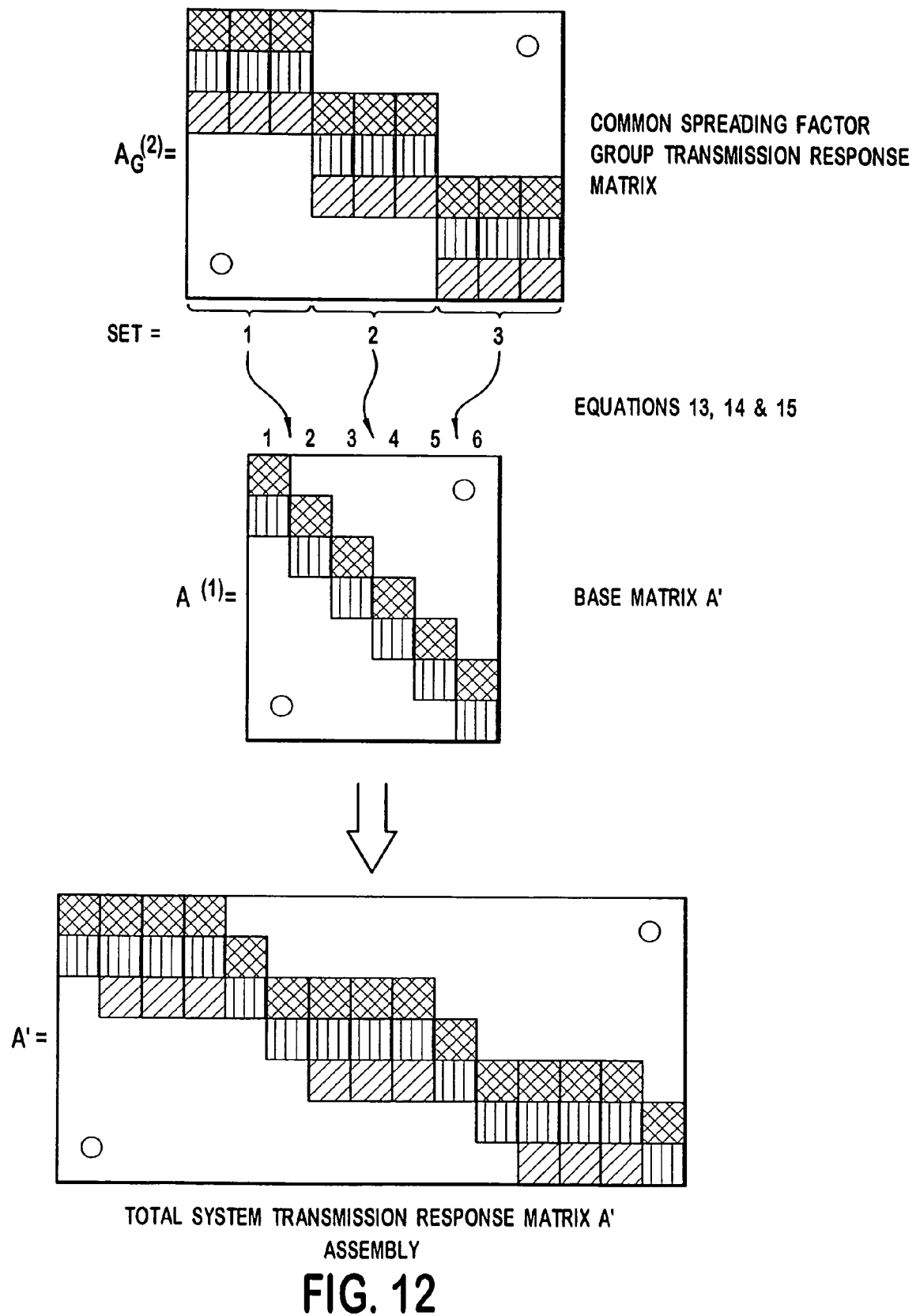
FIG. 12 depicts the steps for assembling an A' matrix in accordance with the present invention.

The processor 33 copies the column set defined by Equation 15 from $A_G^{(g)}$ and inserts it (step 219) into the base matrix A' after the column of $A_G^{(1)}$ which has the reference location defined by Equation 14 as shown in FIG. 12. The remaining columns of the spreading factor group matrix under consideration are copied and inserted into the base matrix A' similarly (step 221). After all columns from one spreading factor group matrix are placed, the processor 33 chooses the next spreading factor group matrix $A_G^{(g)}$ (step 223) and executes the above method. Equations 13, 14 and 15 allow the $i^{th}$ columns from the remaining spreading factor group transmission matrices $A_G^{(g)}$ to be placed in A' after an $m^{th}$ column that has similar support (step 225).

When the system spreading factors are not even integer multiples of each other, the right side expression of Equation 13 does not yield an integer. In this case, the processor 33 will round the result of Equation 13 to the nearest integer above or the nearest integer below the value (step 213). The rounding direction has negligible effect on overall system performance. The order in which the rest of the group system transmission matrices $A_G^{(g)}$ are considered may have some effect on the system performance. A priori knowledge of the spreading factors can be used to choose an optimum order in advance.

Using the arrangement techniques described above, and for the case when spreading factors are even integer multiples of each other, a matrix bandwidth B can be achieved which can be shown to be bounded as:

$$\left(\left\lceil\frac{W-1}{Q_{MAX}}\right\rceil\cdot\sum_{k=1}^{K}\frac{Q_{MAX}}{Q^{(k)}}\right)\leq B\leq \quad \text{Equation 16}$$

$$\left(\left(\left\lceil\frac{W-1}{Q_{MAX}}\right\rceil+1\right)\cdot\sum_{k=1}^{K}\frac{Q_{MAX}}{Q^{(k)}}\right)-1$$

Equation 16 predicts that the bandwidth of the total system transmission response matrix of Equation 11 will be between 3 and 6. An examination of Equation 12 reveals that the bandwidth after either arrangement method 99, 199 of the present invention 17 is 4.

The improvement the present invention 17 provides is further appreciated as the number of transmitted symbols increase. If a system transmitted 16,000 chips (800 symbols for a first user and 400 symbols for a second user), the bandwidth of the matrix $A^H A$ would be approximately 800. Using the arrangement method 99 to produce a total system response matrix A, the bandwidth of $A'^H A'$ remains four since bandwidth (Equation 16) is independent of the number of transmitted symbols. After all of the elements of objective matrix O are derived, the inverse 41 is performed. Since the complexity of inverting a matrix is proportional to the square of its bandwidth, the present invention 17 provides a reduction of computational complexity by a factor of approximately $(800/4)^2 = 200^2 = 40,000$.

The total system transmission response matrix A' provides the response characteristics to the matched-filter 25. Each column of the system response matrix A' is a vector which represents the response characteristics of a particular symbol. The received data vector r is input to the matched-filter 25 where it is matched with every response characteristic from the total system transmission response matrix A' to produce a matched filter output vector y. Each element of output vector y corresponds to a preliminary estimate of a particular symbol transmitted by a given user. The output vector y from the matched-filter 25 is loaded into a multiplier 43 with the inverted objective matrix O. Both the matched-filter 25 output vector y and the inverted objective matrix O are multiplied yielding a user data vector d. The user data vector d contains all of the data transmitted from all users during the discreet time block. Since the objective matrix O and the matched filter 25 output are based on the total system response matrix A', the user data vector d must be de-scrambled. The descrambling process 149 is the inverse of the arrangement methods 99, 199.

A descrambler 45 re-arranges each element of the user data vector d based upon the column re-assignments performed while undergoing either arrangement method 99, 199. The elements of the data vector d are in the same order dictated by the total transmission response matrix A, 1, 9, 2, 3, 10, 4, 5, 11, 6, 7, 12, 8, transposed vertically. The descrambler 45 allocates a memory space having the same dimension and places each vector element in sequential order, 1-12. After the user data vector d is descrambled 149, the user data is output 23 for further processing.

While the present invention has been described in terms of the preferred embodiment, other variations which are within the scope of the invention as outlined in the claims below will be apparent to those skilled in the art.

What is claimed is:

1. A method for recovering data from a plurality of data signals that are not all encoded with same spreading factor, the method comprising:

receiving the plurality of data signals;

determining an impulse response for each received data signal;

deriving a system response matrix for each data signal using that data signal's impulse response and a spreading code of that data signal;

grouping the system response matrices into groups having a same spreading factor for their corresponding data signals;

for each group, constructing a group system response matrix comprising columns of all the system response matrices in that group by sequentially inserting one column from each system response matrix of the group, in turn;

for each group, in sequence, excluding the group having a lowest spreading factor, inserting the columns of that group system response matrix into the lowest spreading factor group system response matrix as a well banded total system response matrix having a limited band width; and determining data of the data signal using the received data signals and the total system response matrix.

2. The method of claim 1, wherein the determining data comprises:

filtering said plurality of data signals with said total system response matrix yielding a matched filter output;

forming an objective matrix based upon said total system response matrix;

inverting said objective matrix;

multiplying said matched filter output with said inverted objective matrix yielding estimated data; and descrambling said estimated data yielding data corresponding to the plurality of data signals.

3. The method of claim 1 wherein inserting the columns further comprises:

choosing one group system response matrix for consideration from the non-excluded groups;

deriving a column placement reference for a first column of said chosen spreading factor group matrix;

deriving a reference location in said total system response matrix;

deriving a column set from said chosen spreading factor group matrix;

inserting said column set after said column placement reference in said total system response matrix;

repeating the choosing, deriving a column placement reference, deriving a reference location, and inserting for each successive column of said group system response matrix under consideration; and repeating the steps of choosing, deriving a reference location, deriving a column, inserting, and repeating for the remaining group response matrices of the non-excluded groups.

4. The method of claim 3 wherein the deriving a column placement reference further comprises assigning a column placement reference index m for said group system response matrix under consideration using:

$$m = n \cdot \frac{Q^{(g)}}{Q^{(1)}} - \frac{Q^{(g)}}{2 \cdot Q^{(1)}}$$

where $Q^{(g)}$ denotes the spreading factor associated with the spreading factor group matrix under consideration, $Q^{(1)}$ denotes the lowest spreading factor among all groups and n is the column of the spreading factor group matrix under consideration where n=1, 2, 3, . . . .

5. The method of claim 4 further characterized by rounding off the index to an integer when the index is not an integer.

6. The method of claim 1 wherein the data determining uses a minimum mean square error detector.

7. The method of claim 1 wherein the data determining uses a zero-forcing block linear equalizer.

8. The method of claim 1 wherein the data determining uses a decorrelator.

9. An apparatus configured to recover data from a plurality of data signals that are not all encoded with same spreading factor comprising:
  a receiver configured to receive the plurality of data signals and to determine an impulse response for each received data signal;
  a data detector configured to derive a system response matrix for each data signal using that data signal's impulse response and a spreading code of that data signal;
  the data detector configured to group the system response matrices into groups having a same spreading factor for their corresponding data signals;
  the data detector configured to construct, for each group, a group system response matrix comprising columns of all the system response matrices in that group by sequentially inserting one column from each system response matrix of the group, in turn;
  the data detector configured to construct a well banded total system response matrix having a limited band width from the group system response matrix for a group having a lowest spreading factor by inserting the columns of each other group system response matrix into the lowest spreading factor group's group system response matrix; and
  the data detector configured to determine, data of the data signal using the received data signals and the well banded total system response matrix.

10. The apparatus of claim 9 wherein the data detector is configured to determine data of the data signal by:
  filtering the plurality of data signals with the well banded total system response matrix to yield a matched filter output;
  forming an objective matrix based upon the well banded total system response matrix;
  inverting objective matrix;
  multiplying the matched filter output with the inverted objective matrix to yield estimated data; and
  descrambling the estimated data to yield data corresponding to the plurality of data signals.

11. The apparatus of claim 9, wherein the data detector is configured to:
  choose one group system response matrix for consideration from the non-excluded groups;
  derive a column placement reference for a first column of the chosen group system response matrix;
  derive a reference location in the well banded total system response matrix;
  derive a column set from the chosen group system response matrix; and
  insert the column set after the column placement reference in the well banded total system response matrix.

12. The apparatus of claim 11 wherein the data detector is configured to assign a column placement reference index m for the chosen group system response matrix using, $$m = n \cdot \frac{Q^{(g)}}{Q^{(1)}} - \frac{Q^{(g)}}{2 \cdot Q^{(1)}}$$

where $Q^{(g)}$ denotes the spreading factor associated with the chosen group system response matrix, $Q^{(1)}$ denotes the lowest spreading factor among all groups and n is the column of the chosen group system response matrix.

13. The apparatus of claim 12 wherein the data detector is configured to round off the index m to an integer when the index m is not an integer.

14. The apparatus of claim 9 wherein the data detector includes a minimum mean square error detector.

15. The apparatus of claim 9 wherein the data detector includes a zero-forcing block linear equalizer.

16. The apparatus of claim 9 wherein the data detector includes a decorrelator.

17. The apparatus of claim 9 configured as a wireless communication station for use in a Code Division Multiple Access (CDMA) system.

18. The apparatus of claim 10 configured as a wireless communication station for use in a Code Division Multiple Access (CDMA) system.

19. The apparatus of claim 11 configured as a wireless communication station for use in a Code Division Multiple Access (CDMA) system.

20. The apparatus of claim 12 configured as a wireless communication station for use in a Code Division Multiple Access (CDMA) system.

* * * * *

UNITED STATES PATENT AND TRADEMARK OFFICE
CERTIFICATE OF CORRECTION

PATENT NO. : 7,778,232 B2
APPLICATION NO. : 11/588454
DATED : August 17, 2010
INVENTOR(S) : Reznik et al.

Page 1 of 1

It is certified that error appears in the above-identified patent and that said Letters Patent is hereby corrected as shown below:

At Claim 4, column 15, line 9, after "with the", insert --chosen--.

At Claim 4, column 15, line 10, delete, "spreading factor group matrix under consideration" and insert --group system response matrix--.

At Claim 4, column 15, lines 12-13, delete "spreading factor group matrix under consideration where n= 1, 2, 3,…" and insert --chosen group system response matrix--.

At Claim 10, column 16, line 3, after "inverting" insert --the--.

Signed and Sealed this
Eleventh Day of October, 2011

David J. Kappos
*Director of the United States Patent and Trademark Office*